United States Patent
Lee et al.

(10) Patent No.: US 12,460,177 B2
(45) Date of Patent: Nov. 4, 2025

(54) COMPOSITION FOR PROMOTING EFFICIENCY OF SOMATIC CELL REPLICATION

(71) Applicant: SEOUL NATIONAL UNIVERSITY HOSPITAL, Seoul (KR)

(72) Inventors: Eun Ju Lee, Seoul (KR); Hyo-Soo Kim, Seoul (KR)

(73) Assignee: SEOUL NATIONAL UNIVERSITY HOSPITAL, Seoul (KR)

( * ) Notice: Subject to any disclaimer, the term of this patent is extended or adjusted under 35 U.S.C. 154(b) by 1247 days.

(21) Appl. No.: 16/969,045

(22) PCT Filed: Feb. 12, 2019

(86) PCT No.: PCT/KR2019/001686
§ 371 (c)(1),
(2) Date: Aug. 11, 2020

(87) PCT Pub. No.: WO2019/160299
PCT Pub. Date: Aug. 22, 2019

(65) Prior Publication Data
US 2021/0139845 A1   May 13, 2021

(30) Foreign Application Priority Data
Feb. 13, 2018   (KR) .................. 10-2018-0017472

(51) Int. Cl.
*C12N 5/073* (2010.01)
*C07K 14/575* (2006.01)

(52) U.S. Cl.
CPC ...... *C12N 5/0604* (2013.01); *C07K 14/57536* (2013.01); *C12N 2501/998* (2013.01)

(58) Field of Classification Search
CPC .................. C07K 14/57536; C12N 15/877
See application file for complete search history.

(56) References Cited

U.S. PATENT DOCUMENTS

2017/0152476 A1   6/2017   Mitalipov et al.

FOREIGN PATENT DOCUMENTS

| KR | 20120134360 A | 12/2012 |
|---|---|---|
| KR | 20160089110 A | 7/2016 |
| KR | 101677293 B1 | 11/2016 |

OTHER PUBLICATIONS

Bu, 2022, Genome Research, 32:1487-1501.*
Ghazimoradi (Scientifc Reports | (2023) 13:1154).*
Wang (Developmental Dynamics 248:10-20, 2019).*
De Carvalho (Trends Cell Biol. Oct. 2010 ; 20(10): 609-617).*
He (Retina, Fifth edition, vol. 1, 2013, Chapter 33, pp. 645-651).*
Matoba (2024, Stem Cell Reports. vol. 19, 906-921).*
Cayman UNC0642 Product information page, https://cdn.caymanchem.com/cdn/seawolf/insert/14604.pdf, accessed Apr. 29, 2025.*
Matoba (2014, Cell, 159(4):884-895).*
Khoury-Haddad, 2014, PNAS, E728-E737.*
Varghese, 2021, frontiers in Oncology, vol. 11, article 750315, 13 pages.*
Young Gie Chung et al., 'Histone Demethylase Expression Enhances Human Somatic Cell Nuclear Transfer Efficiency and Promotes Derivation of Pluripotent Stem Cells', Cell Stem Cell, vol. 17(6), pp. 758-766, Dec. 3, 2015.
Wendy Rosales et al., 'Role of Histone Demethylases in Cardiomyocytes Induced to Hypertrophy', BioMed Research International, 2016, vol. 2016, Article ID 2634976, 7 pages.
Cui, Long et al., 'Endothelin-1 promotes human germinal vesicle-stage oocyte maturation by downregulating connexin-26 expression in cumulus cells', Molecular Human Reproduction, Nov. 8, 2017, vol. 24(1), pp. 27-36.

* cited by examiner

Primary Examiner — Valerie E Bertoglio
(74) Attorney, Agent, or Firm — Riverside Law LLP

(57) ABSTRACT

The present invention relates to a composition for promoting the efficiency of somatic cell replication, comprising endothelin as an active ingredient. When somatic cells are treated with the composition of the present invention, H3K9me3, which is suspected to be a factor for the lowering success rate of nuclear substitution, is inhibited, and H3K4me3, which has the opposite effect, is increased to increase the success rate of nuclear substitution. Accordingly, the composition of the present invention increases the efficiency of somatic cell replication, thereby increasing the efficiency of producing pluripotent stem cells derived from nuclear substitution, and ultimately, the composition is expected to contribute to the development of cell therapeutic agents.

4 Claims, 3 Drawing Sheets
Specification includes a Sequence Listing.

COMPOSITION FOR PROMOTING EFFICIENCY OF SOMATIC CELL REPLICATION

CROSS-REFERENCE TO RELATED APPLICATIONS

This application is the U.S. national phase application filed under 35 U.S.C. § 371 claiming benefit to International Patent Application No. PCT/KR2019/001686, filed on Feb. 12, 2019, which claims priority to Korean Patent Application No. 10-2018-0017472, filed Feb. 13, 2018, the disclosures of which are incorporated herein by reference in their entirety.

REFERENCE TO A "SEQUENCE LISTING," A TABLE, OR A COMPUTER PROGRAM LISTING APPENDIX SUBMITTED AS AN ASCII TEXT FILE

The present application hereby incorporates by reference the entire contents of the text file named "206132-0099-00US_Sequence_Listing_v2.txt" in ASCII format. The text file containing the Sequence Listing of the present application was created on Dec. 14, 2020 and is 944 bytes in size.

TECHNICAL FIELD

The present invention relates to a composition for promoting somatic cell replication efficiency and a method of promoting somatic cell replication efficiency.

BACKGROUND ART

Stem cells are undifferentiated cells that can infinitely self-regenerate and differentiate into cells of any tissue in the body. Stem cell research is a promising research field that aims at studying regenerative medicine, developing a cell therapeutic agent such as novel drug development, and studying the cause and treatment of human diseases, and the developmental process of the human body.

Totipotent stem cells refer to cells existing up to the 8-cell phase after fertilization of an egg by sperm, and if these cells are isolated and then transplanted into the uterus, they can develop into a single complete individual. Pluripotent stem cells are derived from the inner cell mass located in a blastocyte appearing 4 to 5 days after fertilization, and can develop into various cells and tissues, but do not form a new living organism. Multipotent stem cells are stem cells that can differentiate only into cells specific for tissues and organs in which the cells are included.

Embryonic stem cells among all stem cells are made from the inner cell mass of an embryo before implantation, and can differentiate into 200 or more cells under a suitable environment and create an entire organ. However, embryonic stem cells, as a cell therapeutic agent, have to be made using an egg, and have an ethical problem that they can be obtained only by destroying the embryo, and also have various problems such as difficulty in clinical use due to immunorejection.

Recently, as a countermeasure against this, induced pluripotent stem cells have been reported. Induced pluripotent stem cells refer to cells with pluripotency by dedifferentiating the differentiated cells, and have the capability to self-regenerate, similar to embryonic stem cells, and are able to differentiate into all types of cells of the body. To date, induced pluripotent stem cells have been reported to have almost the same characteristics as pluripotent stem cells such as embryonic stem cells in terms of gene expression and differentiation potency.

Meanwhile, in regenerative medicine, a technique of producing somatic cell nuclear transfer (SCNT)-derived pluripotent stem cells, prepared by injecting a nucleus of a human somatic cell into a denucleated egg, is a key technique whose potential range of use has been recently expanding, including disease modeling and new drug development as well as treatment of a specific disease in an individual.

However, successful induction of pluripotent stem cells after nuclear transfer has a problem of difficulty in application due to very low efficiency. Recently, it has been found that such low efficiency occurs in a remodeling process of the gene of a donor cell, and results in, particularly, the expression of histone H3 lysine 9 trimethylation (H3K9me3) of a donor cell not being reduced during SCNT.

DISCLOSURE

Technical Problem

The inventors had studied a gene regulating the expression of H3K9me3 based on the fact that the success rate of pluripotent stem cells can increase only by lowering the H3K9me3 expression of a donor cell, and thus the present invention was completed.

The present invention is directed to providing a composition for promoting somatic cell replication efficiency, which includes endothelin as an active ingredient.

The present invention is also directed to providing a composition for promoting nuclear transfer efficiency, which includes endothelin as an active ingredient.

The present invention is also directed to providing a method of promoting somatic cell replication efficiency using a composition including endothelin as an active ingredient.

However, technical problems to be solved in the present invention are not limited to the above-described problems, and other problems which are not described herein will be fully understood by those of ordinary skill in the art from the following descriptions.

Technical Solution

To achieve the objects of the present invention, the present invention provides a composition for promoting somatic cell replication efficiency, which includes endothelin as an active ingredient.

In the present invention, the somatic cell may be a human cell or animal cell.

In the present invention, the somatic cell replication may be preparation of somatic cell nuclear transfer (SCNT)-derived cells.

In the present invention, the promotion of the somatic cell replication efficiency may result from promotion of SCNT efficiency.

In the present invention, the endothelin includes endothelin-1, endothelin-2, endothelin-3, an endothelin modifier, big endothelin (big ET) and prepro endothelin (prepro ET).

In the present invention, the endothelin modifier includes the sequence of SEQ ID NO: 1 consisting of amino acids 16 to 21 as is, and one or more of amino acids 1 to 15 are modified or deleted, among the 21 amino acids constituting endothelin.

In the present invention, the prepro ET and big ET may include an amino acid sequence of SEQ ID NO: 1.

In addition, the present invention provides a composition for promoting nuclear transfer efficiency, which includes endothelin as an active ingredient.

In addition, the present invention provides a method of promoting somatic cell replication efficiency, which includes treating a composition including endothelin as an active ingredient in SCNF.

In addition, the present invention provides a method of promoting nuclear transfer efficiency, which includes treating a composition including endothelin as an active ingredient in SCNF.

In addition, the present invention provides a use of a composition including endothelin as an active ingredient for promoting somatic cell replication efficiency.

In addition, the present invention provides a use of a composition including endothelin as an active ingredient for promoting nuclear transfer efficiency.

Advantageous Effects

According to the present invention, when somatic cells are treated with a composition including endothelin as an active ingredient, H3K9me3 pointed out as a factor that lowers a success rate in nuclear transfer is suppressed, and H3K4me3 which has the opposite activity increases, thereby enhancing the success rate of the nuclear transfer. Therefore, the composition of the present invention increases the efficiency of preparing nuclear transfer-derived pluripotent stem cells by promoting somatic cell replication efficiency, and is ultimately expected to contribute to the development of a cell therapeutic agent.

MODES OF THE INVENTION

Figure 1:
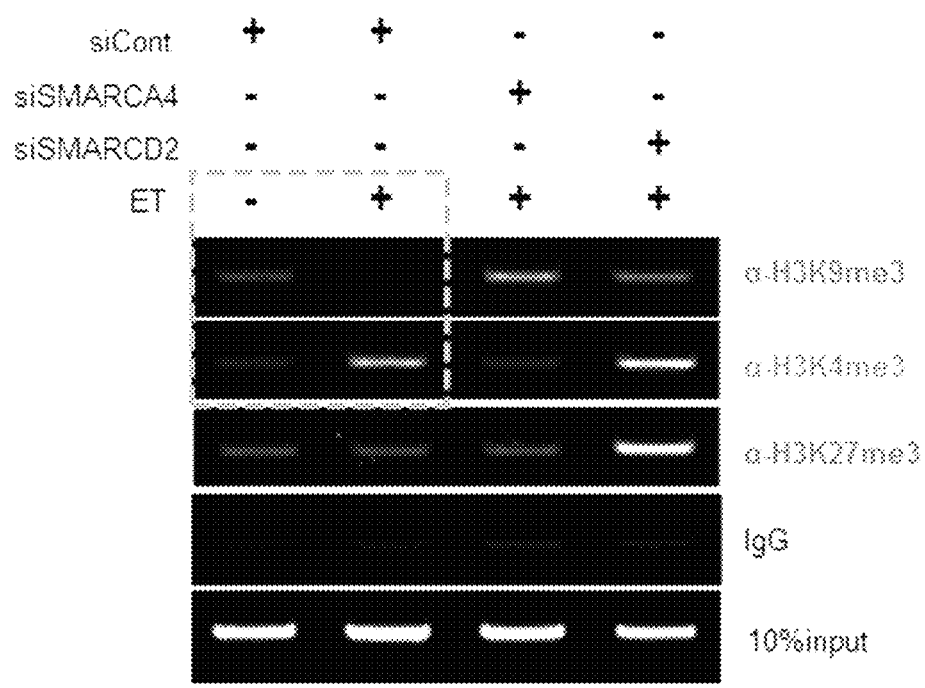
FIG. 1 is a ChIP PCR result showing that, in the promoter region of a demethylase, H3K9me3 suppressing gene expression is detached, and the binding of H3K4me3 promoting gene expression increases, by endothelin.

The inventors first found the fact that somatic cell replication efficiency can be promoted by endothelin serving to suppress the expression of H3K9me3 known as a gene expression suppressor, and based on this, the present invention was completed.

The "endothelin" used herein is a peptide generated in vascular endothelial cells and consists of 21 amino acid residues (Yanagisawa M et al., Nature, 332:411-415, 1988), and is known as a vasoconstrictive peptide. Endothelin has two S—S bonds in one molecule, and is produced by modifying an endothelin precursor.

Most mammals have isopeptide endothelin-1, endothelin-2 and endothelin-3. The three types of isopeptide endothelin have similar functions and effects of transient vasodilation and persistent vasoconstriction.

The "endothelin" used herein includes endothelin-1, endothelin-2, endothelin-3, an endothelin modifier, big endothelin (big ET) and prepro endothelin (prepro ET).

The "endothelin modifier" used herein refers to a form of endothelin, which includes the amino acid 16 to 21 as an active site (SEQ ID NO: 1), and one or more of the amino acids 1 to 15 are modified or deleted, and in other words, it refers to a form in which a region excluding the amino acids 16 to 21, which is a main part responsible for the activity of endothelin, is modified or deleted, and is also called an endothelin derivative. The endothelin modifier has similar functions and effects to those of endothelin binding to a receptor.

SEQ ID NO: 1: His-Leu-Asp-Ile-Ile-Trp

The "modifier" refers to the substitution of one or more amino acids of amino acids 1 to 15 constituting endothelin with different amino acids, and the "deletion" refers to deletion of one or more amino acids of amino acids 1 to 15 constituting endothelin.

The "prepro endothelin (prepro ET)" refers to 212 amino acids first produced by transcribing a gene encoding endothelin, and prepro ET produces "big endothelin (big ET)" consisting of 38 amino acids by an enzyme action. Endothelin is produced by detaching an amino acid of the C-terminal by the action of an endothelin converting enzyme (ECM) on big ET.

There is no limitation to the "somatic cell" used herein, and the somatic cells include human and animal cells having a variety of genetic backgrounds and/or origins.

The "somatic cell" refers to a cell having no or limited pluripotency after differentiation has been completed, and the "differentiation" is a phenomenon in which structures and functions of cells are specialized during cell growth by division and proliferation, and refers to the change in shape or function of cells or tissue of a living organism to perform a task given to each. The somatic cell used herein may be a naturally-occurring somatic cell or genetically-modified somatic cell.

The "stem cell" used herein may be a cell having the capability to differentiate into various types of body tissue, that is, an undifferentiated cell, and may be classified into an embryonic stem cell and an adult stem cell. The "embryonic stem cell" refers to an undifferentiated cell which has differentiation potency but has not differentiated yet, and a cell having pluripotency, which is able to differentiate into various tissue cells when suitable conditions are adjusted in the undifferentiated state, and in a broad meaning, includes embryoid bodies derived from embryonic stem cells. The term "adult stem cell" refers to a cell having limited differentiation potency, which cannot differentiate into all types of tissue, but can differentiate into a target organ. In addition, the "differentiation potency" refers to the ability of a part of the embryo to differentiate into various types of organs or tissue under given genesis conditions in the early genesis of a living organism.

The "pluripotent stem cell" used herein refers to a cell having the capability to differentiate into all cells related to the three germ layers, including the mesoderm, the endoderm and the ectoderm, necessary for the formation of an individual, and such capability indicates the ultimate ability of stem cells. In addition, since a pluripotent stem cell gene refers to a marker having such ability, or a gene having the capability to induce pluripotency, it is also classified as a dedifferentiation-inducing factor.

In the present invention, histone methyltransferase refers to an enzyme that suppresses or promote gene expression by attaching a methyl group to a lysine (K) or arginine (R) residue of a histone protein. H3K9me3 is an enzyme that attaches three methyl groups to a lysine residue of histone H3, and suppresses gene expression.

In one embodiment of the present invention, when human mesenchymal stem cells are pretreated with endothelin, it was confirmed, by a chromatin immunoprecipitation (ChIP) assay, that the expression of H3K9me3 known as a gene expression suppressor is suppressed, but the expression of H3K4me3 known as a gene expression activator increases (see Example 1). Apobec1, as a deaminase, is a gene also known to serve as a demethylase, and the activation of this gene causes demethylation on a whole genome, ultimately resulting in an increase in the expression of the entire gene.

Figure 2:
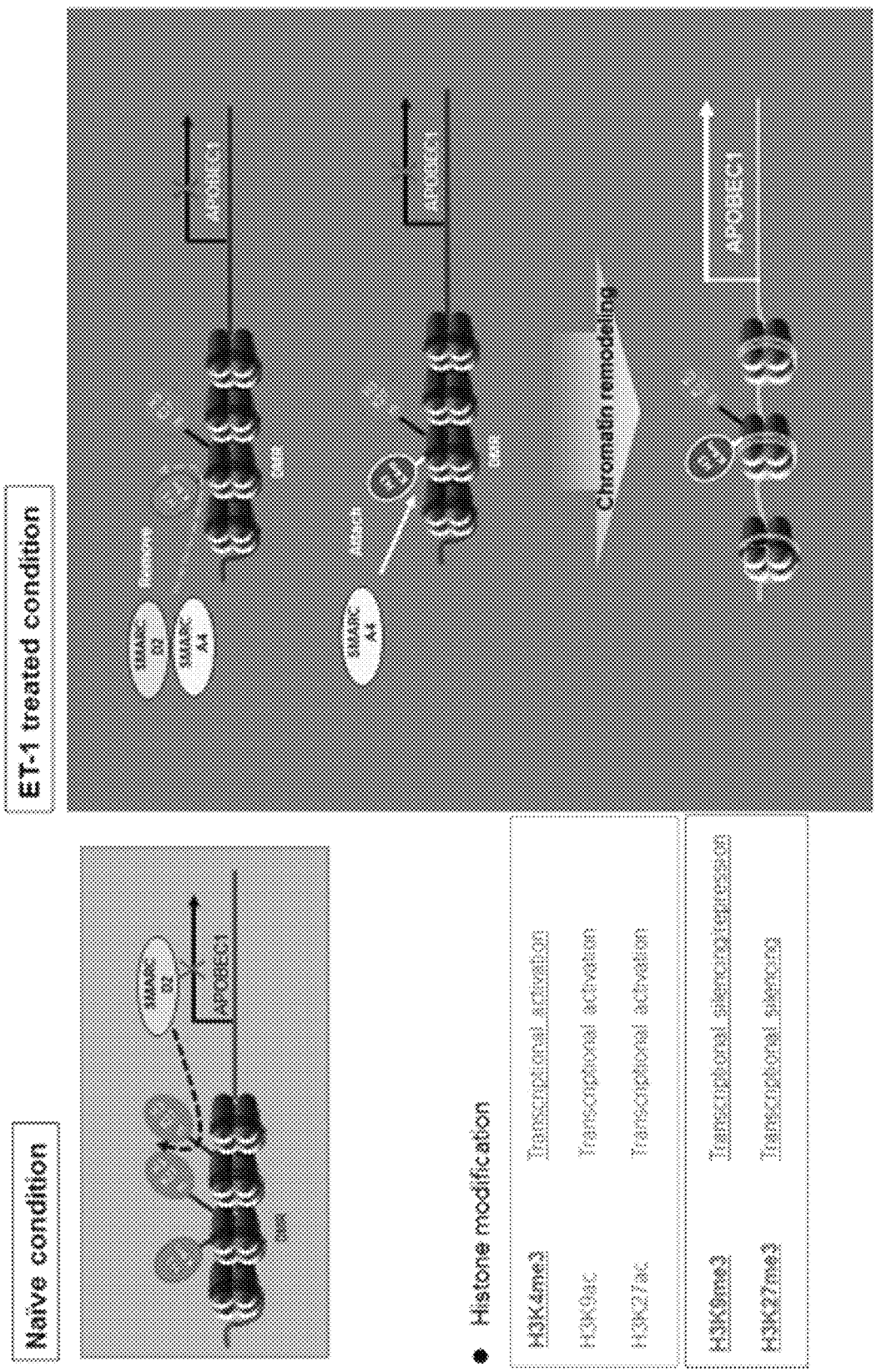
FIG. 2 is a schematic diagram illustrating the promotion of demethylase and APOBEC1 expression by endothelin.

It is confirmed by the knock-down of SMARC A4 and SMARC D2 using siRNA that the expression of Apobec1 by endothelin is caused by H3K9me3 of the Apobec1 promoter region transiting to H3K4me3 by SMARC A4 and SMARC D2 mediators (see the third and fourth lanes of FIG. 1). In this regard, a diagram illustrating the promotion of demethylase and APOBEC1 expression by endothelin is shown in FIG. 2. An SWI/SNF-related, matrix-associated and actin-dependent regulator of chromatin (SMARC) is a gene cluster known as a chromatin regulator, and it is confirmed that the promotion of demethylase and APOBEC1 expression by endothelin is mediated by SMARC.

Figure 3:
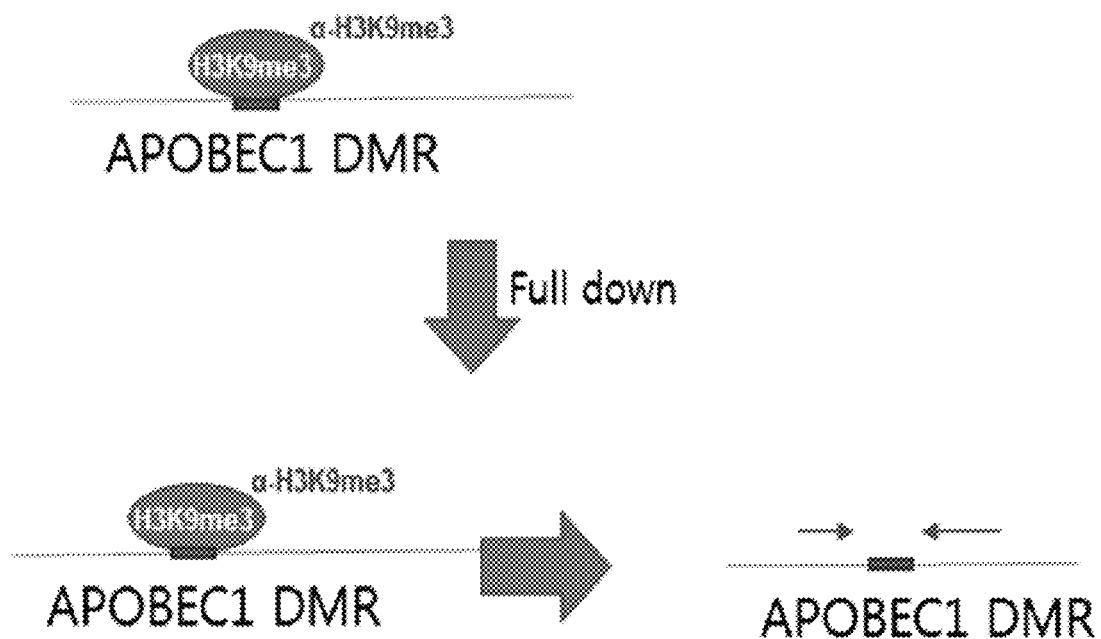
FIG. 3 is a diagram for explaining ChIP performed to show the H3K4me3→H3K9me3 transition in the promoter regions of a demethylase and APOBEC1 by endothelin.

In addition, the inventors performed ChIP to show the H3K4me3→H3K9me3 transition in the promoter regions of demethylase and APOBEC1 by endothelin, and specifically, total genomic DNA was extracted, fragmented and reacted with a H3K4me3 or H3K9me3 antibody for a pull-down assay, and PCR was performed after finding a histone-binding site in the APOBEC1 promoter region (see FIG. 3).

Hereinafter, to help in understanding the present invention, exemplary examples will be suggested. However, the following examples are merely provided to more easily understand the present invention, and not to limit the present invention.

EXAMPLE

Example 1. Confirmation of Effect of Inhibiting H3K4Me3 Gene Expression by Endothelin Human mesenchymal stem cells were transfected with siRNA of SMARCA4 or SMARCD2, treated with endothelin, and then harvested. In the present invention, human mesenchymal stem cells (Poietics™ Human Mesenchymal Stem Cells, Lonza) were used. The cells were selected by conducting a human mesenchymal stem cell identification experiment, and identified and classified as human bone marrow-derived stem cells after the expression of a positive cell marker (CD29, CD90, CD44, CD73, CD105 or CD166) for mesenchymal stem cells, the negative identification by a cell marker (CD34, CD45, CD14, HLA-DR or CD19), and the confirmation of multipotency of mesenchymal stem cells.

Genomic DNA was extracted from the recovered cells, and reacted with a H3K9me3 or H3K4me3 antibody [anti-H3K9me3 (Abcam: cat. no. ab8898), anti-H3K4me3 (Abcam; cat. no. ab8580) or normal rabbit IgG (Cell Signaling Technology: cat. no. #2729): negative control], followed by ChIP-PCR performed using Apobec1 promoter primers that are able to confirm the binding of H3K9me3 or H3K4me3.

```
Forward primer:
5'-GAGGTCAAGAGTTCAAAAACAGCC-3'

Reverse primer:
5'-TATTTATTTTTCATTATCTCCTACTCTGC-3'
```

Specifically, human mesenchymal stem cells were treated with 4% PFA for crosslinking for 10 minutes, reacted with 125 mM glycine for 5 minutes, lysed with a ChIP buffer (50 mM NaCl, 150 mM Tris-HCl (pH 8.0), 0.5% Triton X-100, 1 mM EDTA, 0.1% sodium deoxycholate, 0.1% sodium dodecyl sulfate [SDS] including 1× Xpert protease inhibitor cocktail [GeneDEPOT, Barker, TX, USA]), and sheared into 200 to 500-bp DNA fragments using a BIORUPTOR® Sonicator (Diagenode, Denville, NJ, USA). A H3K9me3 or H3K4me3 antibody was added, and protein A/G agarose beads (Abcam) were then added for a pull-down assay and then sequentially washed with a wash buffer three times (low-salt buffer: 20 mM Tris-HCl, 150 mM NaCl, 0.5% Triton X-100, 0.1 mM EDTA; high-salt buffer: same as low-salt buffer except for 500 mM NaCl; lithium-chloride buffer: same as low-salt buffer except for 250 mM LiCl instead of NaCl).

Subsequently, the resulting product was heated at 65° C. for 4 hours to remove a crosslink. DNA fragments were collected using a PCR purification kit (Qiagen) and analyzed using qPCR and semi-quantitative PCR, and the results are shown in FIG. 1.

As shown in FIG. 1, it can be seen that, because of endothelin, in the demethylase promoter region (represented by a gray dotted box), H3K9me3 suppressing gene expression is detached, and binding of H3K4me3 promoting gene expression increases. Through this, it was confirmed that histone modification that regulates gene expression proceeds and chromatin remodeling is performed by endothelin.s

INDUSTRIAL APPLICABILITY

A composition including endothelin as an active ingredient according to the present invention is expected to promote somatic cell replication efficiency, thereby increasing the efficiency of preparing nuclear transfer-derived pluripotent stem cells, and ultimately, it is expected to be effectively used in the development of a cell therapeutic agent.

What is claimed is:

1. A method of promoting somatic cell nuclear transfer efficiency, comprising:
   a) contacting a donor cell with a composition comprising endothelin as an active ingredient, wherein the donor cell is a mesenchymal stem cell; and
   b) extracting the nucleus of the donor cell, wherein the endothelin induces a transition of H3K9me3 to H3K4me3 in the Apobec1 promoter region of the extracted nucleus, thereby enhancing the efficiency of somatic cell nuclear transfer when the nucleus extracted in step b) thereby promoting blastocyst formation efficiency is transferred to an oocyte.

2. The method of claim 1, wherein the endothelin is one or more selected from the group consisting of endothelin-1, endothelin-2, endothelin-3, endothelin modifier, big endothelin (big ET) and prepro endothelin (prepro ET).

3. The method of claim 2, wherein, among the 21 amino acids constituting endothelin, the endothelin modifier comprises the sequence of SEQ ID NO: 1 consisting of the amino acids 16 to 21 as is, and one or more of amino acids 1 to 15 are modified or deleted.

4. The method of claim 2, wherein the prepro ET and big ET comprise the amino acid sequence of SEQ ID NO: 1.

* * * * *

SEQUENCE LISTING

```
<160> NUMBER OF SEQ ID NOS: 3

<210> SEQ ID NO 1
<211> LENGTH: 6
<212> TYPE: PRT
<213> ORGANISM: Mus musculus

<400> SEQUENCE: 1

His Leu Asp Ile Ile Trp
1               5
```

```
<210> SEQ ID NO 2
<211> LENGTH: 24
<212> TYPE: DNA
<213> ORGANISM: Artificial Sequence
<220> FEATURE:
<223> OTHER INFORMATION: Apobec1 promoter forward primer

<400> SEQUENCE: 2
gaggtcaaga gttcaaaaac agcc                                      24

<210> SEQ ID NO 3
<211> LENGTH: 29
<212> TYPE: DNA
<213> ORGANISM: Artificial Sequence
<220> FEATURE:
<223> OTHER INFORMATION: Apobec1 promoter reverse primer

<400> SEQUENCE: 3
tatttatttt tcattatctc ctactctgc                                 29
```